(12) United States Patent
Becher et al.

(10) Patent No.: US 10,226,882 B2
(45) Date of Patent: Mar. 12, 2019

(54) METHOD FOR PRODUCING A GASKET ON A COMPONENT AND SHAPING TOOL FOR USE IN SUCH A METHOD

(71) Applicant: Henkel AG & Co. KGaA, Duesseldorf (DE)

(72) Inventors: Jürgen Becher, Munich (DE); Michael Drexl, Odelzhausen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 83 days.

(21) Appl. No.: 15/436,995

(22) Filed: Feb. 20, 2017

(65) Prior Publication Data

US 2017/0157812 A1    Jun. 8, 2017

Related U.S. Application Data

(63) Continuation of application No. PCT/EP2015/068107, filed on Aug. 5, 2015.

(30) Foreign Application Priority Data

Aug. 21, 2014    (DE) .................. 10 2014 216 613

(51) Int. Cl.
*F16J 15/14* (2006.01)
*B29C 33/40* (2006.01)
(Continued)

(52) U.S. Cl.
CPC ............ *B29C 43/027* (2013.01); *B29C 33/40* (2013.01); *B29C 35/0805* (2013.01);
(Continued)

(58) Field of Classification Search
CPC .......... F16J 15/14; F16J 15/108; F16J 15/328; B29D 99/0085; B29C 33/40;
(Continued)

(56) References Cited

U.S. PATENT DOCUMENTS 7,442,422 B2    10/2008   Salameh et al.
7,790,094 B2     9/2010   Lim et al.
(Continued)

FOREIGN PATENT DOCUMENTS

DE          3445715 A1    6/1986
DE     102010002141 A1    8/2011
EP          1477712 A1   11/2004

OTHER PUBLICATIONS

International Search Report for International PCT Patent Application No. PCT/EP2015/068107 dated Oct. 30, 2015.

*Primary Examiner* — William K Cheung
(74) *Attorney, Agent, or Firm* — James E. Piotrowski

(57) ABSTRACT

The invention relates to a method for producing a gasket on a component using a shaping tool, wherein the material used for the gasket is a UV-curable sealing or gasket material, and wherein the shaping tool comprises an upper face and a lower face and at least one cavity which is open toward the lower face of the shaping tool and which is provided for filling with the gasket material, and wherein furthermore the shaping tool is made of a UV-transparent material at least in the region of the cavity, comprising the following steps in the order indicated:
 1. introducing the gasket material into the cavity of the shaping tool;
 2. placing the component onto the lower face of the tool provided with the gasket material;
 3. pressing the component onto the tool;
 4. curing the gasket material by way of UV irradiation; and
 5. removing the tool from the component and the gasket joined thereto.

The invention further relates to a shaping tool for use in such a method.

13 Claims, 2 Drawing Sheets

(51) Int. Cl.
  *B29C 39/28* (2006.01)
  *B29C 43/02* (2006.01)
  *B29D 99/00* (2010.01)
  *F16J 15/10* (2006.01)
  *F16J 15/328* (2016.01)
  *B29C 35/08* (2006.01)
  *B29C 39/02* (2006.01)
  *B29C 43/00* (2006.01)
  B29L 31/26 (2006.01)
  B29K 9/00 (2006.01)
  B29K 33/00 (2006.01)

(52) U.S. Cl.
  CPC .......... *B29C 39/028* (2013.01); *B29C 43/003* (2013.01); *B29C 43/021* (2013.01); *B29D 99/0085* (2013.01); *F16J 15/108* (2013.01); *F16J 15/14* (2013.01); *F16J 15/328* (2013.01); *B29C 2035/0827* (2013.01); *B29K 2009/00* (2013.01); *B29K 2033/08* (2013.01); *B29K 2885/00* (2013.01); *B29L 2031/26* (2013.01); *B29L 2031/265* (2013.01)

(58) Field of Classification Search
  CPC ... B29C 43/021; B29C 43/003; B29C 43/027; B29C 39/028; B29C 35/0805; B29C 2035/0827; B29L 203/26; B29L 203/265; B29K 2885/00; B29K 2033/08; B29K 2009/00
  USPC .......................................................... 264/496
  See application file for complete search history.

(56) References Cited

U.S. PATENT DOCUMENTS

| | | |
|---|---|---|
| 2008/0128955 A1 | 6/2008 | Lim et al. |
| 2008/0289755 A1 | 11/2008 | Burdzy et al. |
| 2009/0004541 A1 | 1/2009 | Jacobine et al. |
| 2009/0004551 A1 | 1/2009 | Burdzy et al. |
| 2009/0162715 A1 | 6/2009 | Burdzy |
| 2011/0115132 A1 | 5/2011 | Burdzy et al. |
| 2013/0026682 A1 | 1/2013 | Rist et al. |
| 2013/0062818 A1* | 3/2013 | DeCato ............... B29C 45/0001 264/496 |

* cited by examiner

METHOD FOR PRODUCING A GASKET ON A COMPONENT AND SHAPING TOOL FOR USE IN SUCH A METHOD

The present application is a continuation of PCT International Patent Application No. PCT/EP2015/068107, filed Aug. 5, 2015, which claims priority to Application No. 10 2014 216613.6, filed in the Federal Republic of Germany on Aug. 21, 2014, which is expressly incorporated herein in its entirety by reference.

The present invention relates to a method for producing a gasket on a component using a shaping tool and to a shaping tool for use in such a method.

Sealing elements of a wide variety are used to avoid undesirable mass transfers from one space to another. Such seals can be produced in different ways.

For numerous application fields, gaskets are produced as separate elements and then inserted at the appropriate location, wherein for this purpose often times a groove is provided in the component to be sealed, into which the gasket is inserted or pressed.

A method for creating a seal on a component is known from EP 1 477 712 A1, in which a sealing material is initially applied to the component to be sealed by way of screen printing and then, using a tool, the geometry of the finished seal is impressed into the sealing material.

Another method is known from the prior art which allows gaskets to be applied directly to the component to be sealed; see U.S. Pat. No. 7,790,094 B2 in this regard, for example. The method provides for a mold including a component to be sealed to be clamped, and for the sealing material to then be injected under pressure into a cavity formed in the mold via a corresponding feed conduit using an injection molding process. It is moreover already known to use UV-curable sealing materials and UV-transparent shaping tools, so that the curing of the sealing material can take place by UV irradiation through the mold. Such methods are also known by the terms "mold-in-place" (MIP) or "cured-in-place" (CIP).

One drawback of the injection molding method is that, due to the pressurized filling process, care must be taken to ensure that the component and the tool are clamped sufficiently firmly together and moreover are sealed with respect to each other in such a way that the sealing material does not egress at an undesirable location. The pressures that can be used to inject the sealing material are therefore limited. However, in particular when producing gaskets having very small dimensions, as they are used for components used in a drive train of vehicles, for example, it has proven to be difficult to inject the sealing material into the accordingly small cavity using limited pressure.

It is therefore the object of the present invention to provide a method for producing a gasket on a component using a shaping tool and to provide a shaping tool to be used in such a method, whereby the drawbacks from the prior art can be overcome.

This object is achieved by a method according to claim 1 and by a shaping tool according to claim 10.

Advantageous embodiments and refinements of the invention are the subject matter of the dependent claims.

According to claim 1, the invention relates to a method for producing a gasket on a component using a shaping tool, wherein the material used for the gasket is a UV-curable sealing or gasket material, and wherein the shaping tool comprises an upper face and a lower face and at least one cavity which is open toward the lower face of the shaping tool and which is provided for filling with the sealing material, and wherein furthermore the shaping tool is made of a UV-transparent material at least in the region of the cavity, comprising the following steps in the order indicated:

1. introducing the sealing material into the cavity of the shaping tool;
2. placing the component onto the lower face of the tool provided with the sealing material;
3. pressing the component onto the tool;
4. curing the sealing material by way of UV irradiation; and
5. removing the tool from the component and the gasket joined thereto.

In other words, the method according to the invention is primarily characterized in that, in a first method step, the sealing material is introduced into the cavity of the tool which is open toward the lower face of the shaping tool and that the component to be sealed is placed onto the lower face of the tool filled with sealing material only in a subsequent method step. Filling of the shaping tool, which hereinafter is also referred to as a mold, under pressure is thus eliminated, so that the above-described disadvantages accompanying pressurized filling of the mold can be overcome.

The designations 'lower face' and 'upper face' are essentially interchangeable, which is to say that the side of the shaping tool toward which the cavity is open can also be referred to as the upper face, and the side facing away from the cavity can be referred to as the lower face of the shaping tool.

A component to be sealed may be understood to mean any suitable component. This component may in particular have a film-like design or be designed as a film, as is the case in the production of fuel cells, for example.

Placing and pressing the component on the tool, as described in method steps 2 and 3, shall be understood to mean a relative movement between the component and the tool. The invention thus also expressly covers methods in which the tool is placed and pressed onto the component. What is essential is that the component and the shaping tool filled with the sealing material in a preceding method step are guided close to each other and pressed together.

The method according to the invention in principle allows gaskets of any arbitrary height to be implemented; however, the method is particularly suitable for producing gaskets having very small dimensions and a height between 0.2 and 1 mm, as they are used in fuel cell production, for example. It goes without saying, however, that such gaskets can also be used in other fields, in particular in engine production.

According to one proposed aspect of the invention, it is provided that the introduction of the sealing material into the cavity of the shaping tool is carried out using a screen printing method. For this purpose, the mold is positioned in a screen printing machine, and the sealing material is introduced into the cavity of the mold through a fine-meshed screen using a squeegee. The screen can be prepared with the aid of templates in such a way that the sealing material is applied only in an intended region, which is the region of the cavity here, and the screen is designed to be impervious to the sealing material outside this region. Depending on the depth of the cavity, and thus the height of the gasket to be formed, multiple squeegeeing of sealing material may be necessary to completely fill the cavity.

Contrary to the injection molding method customary in the prior art, in this way completely pressure-free filling of the mold is possible.

A robotic system may be used according to the invention, in particular to create larger gasket heights, which introduces the sealing material directly into the cavity of the shaping tool in an automated manner.

One embodiment of the invention provides for the shaping tool to be made of a flexible material, preferably silicone or based on silicon, at least in the region of the cavity. In this way, the mold can be removed easily from the component to be sealed, and the gasket joined thereto, after curing has been completed. For this purpose, the flexible material preferably exhibits good release action with respect to the sealing material to be processed and good molding behavior. Since curing of the sealing material according to the invention takes place by way of UV irradiation, the flexible material is additionally UV-transparent and UV-stable, at least in the region of the cavity. In the region of the cavity, the shaping tool may be made of a UV-transparent material throughout from the upper face to the lower face.

A further advantage of the flexible material, of silicone, for example, is that tolerances between the mold and the component to be sealed can be compensated for. The mold made of flexible material ideally conforms to the surface of the component to be sealed. This is particularly important in the method according to the invention also because, contrary to the injection molding process, clamping of the component with the mold and the attendant pressing pressure are dispensed with.

However, in principle, it would also be possible to use non-flexible materials in the region of the cavity, as long as they have the necessary UV transmissibility. These include glass, polycarbonate or PMMA, for example.

So as to stabilize the mold, the same may be made of a non-flexible material in some regions, for example steel, aluminum, or plastic material. In this way, the shaping tool is easier to handle and less prone to become damaged. In any case, however, the shaping tool is made of a UV-transparent material at least in the region of the cavity. Suitable material combinations for the shaping tool are thus aluminum and silicone, or steel and silicone, for example.

The method according to the invention provides for a material having a UV-initiated curing mechanism as the sealing material. According to one proposed aspect of the invention, such a material may be polyacrylate- or polyisobutylene-based. Moreover, the sealing material should preferably be such that, when using the screen printing method, no bubble formation occurs in the product during application of the sealing material. This may optionally be achieved by adding appropriate defoamers.

According to one idea of the invention, curing of the UV-curable sealing material may take place in a UV chamber, into which the mold having the component placed thereon is introduced. As an alternative, the combination of mold and component may be guided close to UV LED fields, by way of which curing takes place. The wavelength range of the emitted UV radiation is preferably between 200 and 550 nm. Radiation having a spectrum of varying wavelengths or else having a spectrum of individual discrete wavelengths, for example 375 nm or 405 nm, may be used for this purpose.

One alternative embodiment of the invention provides for curing of the sealing material to be carried out using UV LEDs, which are applied directly onto the shaping tool. In this way, the manual work step of introducing the tool and the component into a UV chamber is eliminated, or an external UV LED field and the UV radiation can additionally be applied very precisely in the region of the cavity. The comments provided above in connection with UV chambers can be applied equally here with respect to the wavelength ranges of the emitted UV radiation.

According to claim 10, the invention also provides for a shaping tool for use in a method for producing a gasket on a component according to one of claims 1 to 9, wherein the tool comprises an upper face and a lower face and at least one cavity provided on the lower face which has an opening directed to the lower face and through which the cavity can be filled with a sealing material, and wherein furthermore the shaping tool is made of a UV-transparent material at least in the region of the cavity, and wherein, beyond the opening of the cavity, the tool has no supply conduit whatsoever that is open toward an edge of the shaping tool for supplying sealing material.

The comments already provided above in connection with the method according to the invention apply to the designations 'upper face' and 'lower face.'

Contrary to shaping tools that are used in an injection molding process, the claimed tool thus has no supply conduit whatsoever that is open toward an edge of the tool for injecting sealing material. According to the invention, the edge of the tool shall be understood to mean all outer bounds of the tool, with the exception of the lower face in which the cavity is provided. Rather, the mold according to the invention is initially filled with a sealing material, and more particularly by introducing the sealing material into the opening of the cavity which is directed toward the lower face of the tool, before the component to be sealed is placed on the mold thus filled.

The tool is preferably made of a flexible material, such as silicone, at least in the region of the cavity. Moreover, the shaping tool can be made of non-flexible material such as steel, aluminum or plastic material, in some regions, so as to enable easier handling and stabilization.

According to one embodiment of the tool according to the invention, UV LEDs are applied directly onto the shaping tool, so that curing of the sealing material can be carried out without further displacement of the component and the tool, and moreover can be carried out in an easily localizable manner.

BRIEF DESCRIPTION OF THE FIGURES

The invention will be described in more detail hereafter based on exemplary embodiments and with reference to the accompanying drawings. In the drawings:

FIG. 1 shows a sectional illustration of a shaping tool denoted by numeral 10, which is made entirely of silicone. The tool 10 has an upper face 11 and a lower face 12 as well as a circular cavity 13, which is open toward the lower face 12 of the tool 10.

FIG. 2 shows an alternative embodiment of a shaping tool denoted in the overall by numeral 14. The tool 14 comprises a ring 15 made of silicone, in which a cavity 13 is formed analogously to the exemplary embodiment shown in FIG. 1. The silicone ring 15 is UV-transparent. The cavity 13 is open toward the lower face 12 of the tool 14. The silicone ring 15 is embedded in a stabilization aid 16 made of steel, wherein the silicone ring 15 has lateral recesses 17 in which projections 18 of the stabilization aid 16 engage according to the principle of a tongue-and-groove joint, whereby a relative movement of the silicone ring 15 and the stabilization aid 16 is prevented.

Figure 1:
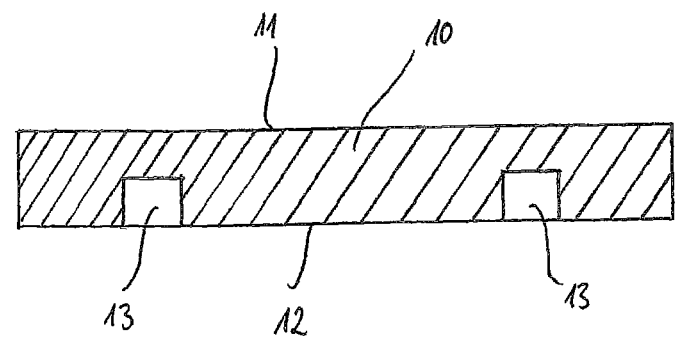
FIG. 1: shows a schematic sectional illustration of one embodiment of the shaping tool according to the invention.

A ring made of UV LEDs 19 is arranged above the silicone ring 15, the LEDs emitting UV radiation in a wavelength range between 200 and 550 nm. A clamp 20 is guided across the UV LEDs and the central core of the stabilization aid 16 so as to fix the UV LEDs and the individual components of the tool 14, the clamp being fixed to the stabilization aid 16 in an edge region of the tool 14 by way of screws 21.

Figure 2:
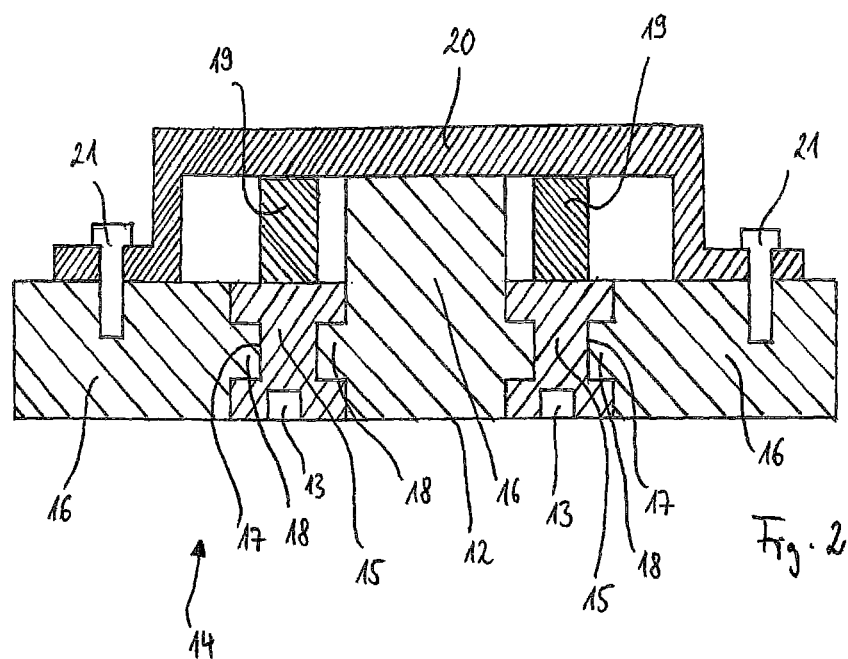
FIG. 2: shows a schematic sectional illustration of an alternative embodiment of the shaping tool according to the invention.

The tool 14 shown only in a sectional view in FIG. 2 has an approximately square outer shape. The silicone ring 15 embedded in the stabilization aid is likewise guided in the shape of a square having rounded edges, and accordingly the cavity 13 also follows this shape. It goes without saying that both the tool 14 and the silicone ring 15, and the cavity 13 formed therein, can also have any other shape, for example that of a circle or an ellipse.

Figure 3:
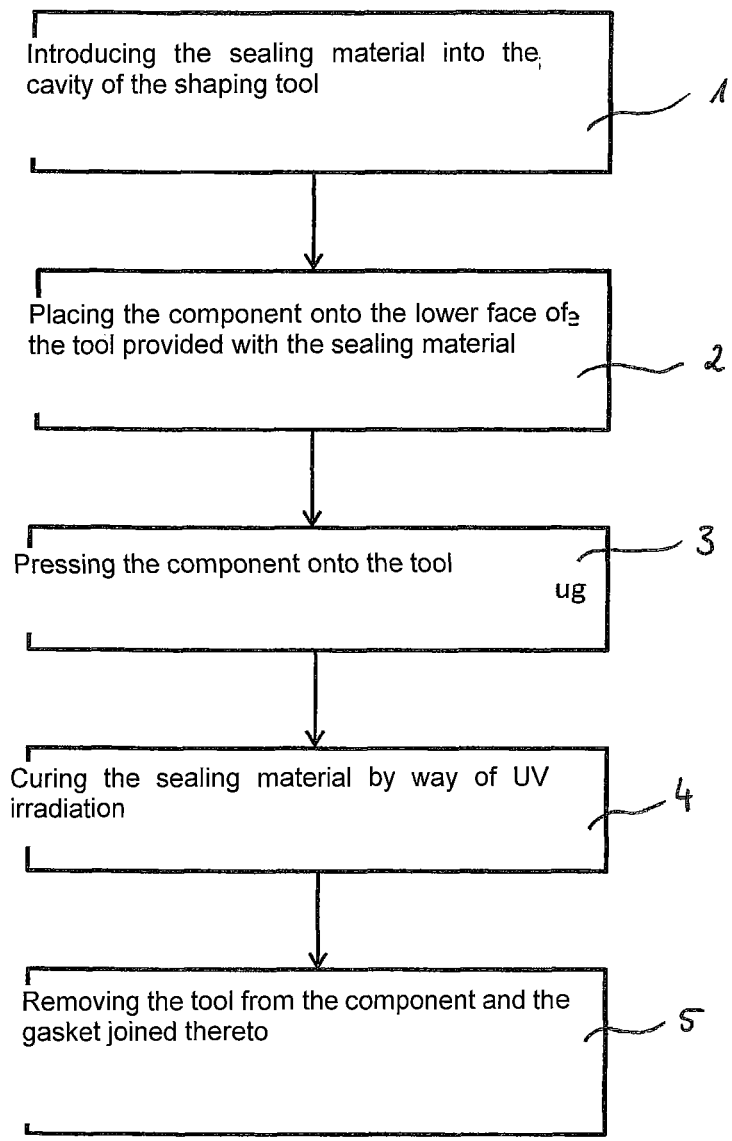
FIG. 3: shows a schematic illustration of the sequence of the method steps of the method according to the invention.

FIG. 3 shows a schematic illustration of the sequence of the individual method steps for carrying out a method for producing a gasket on a component using a shaping tool according to FIGS. 1 and 2. A specific sequence of the method for using the tool 14 of FIG. 2 may be as follows: In a step 1, initially a polyacrylate-based sealing material is introduced into the cavity 13 of the shaping tool 14 using a screen printing method. For this purpose, the tool 14 is turned 180° in relation to the illustration in FIG. 2, so that the lower face 12 of the tool 14 is directed upward with the open cavity 13. The sealing material is applied through a suitably-prepared screen, pressed through the screen by way of a squeegee and introduced into the cavity 13. This method step is repeated until the cavity 13 is filled completely with the sealing material.

According to method step 2, the component to be sealed, which is not shown in the figures, is then placed onto the lower face 12 of the tool 14 provided with the sealing material and, in accordance with method step 3, is pressed onto the tool 14.

In the subsequent method step 4, the UV LEDs 19 provided on the tool 14 are switched on, and the sealing material is cured by way of UV irradiation. Due to the UV transmissibility of the silicone ring 15, the UV radiation can readily enter the region of the cavity 13 and initiates the curing mechanism in the sealing material there. The duration of irradiation depends on the amount of sealing compound to be cured. For sealing heights in the range of 0.2 to 1 mm, curing takes place within a few seconds.

After curing has been completed, the tool 14 is removed from the component to be sealed and the gasket joined to the same in a last method step 5. This is readily possible due to the good release action of the silicone with respect to the polyacrylate-based sealing material.

In principle, the method according to the invention makes higher process speeds possible than with the conventional injection molding method since the filling process and the curing process can be separated from each other. By eliminating the injection unit, moreover the tool and process costs can be lowered. Finally, it is possible to avoid inaccuracies in the geometry of the gasket to be produced, which necessarily occur in the injection molding method due to the injection pressure that is required and since the alignment between the tool and the component is not always optimal.

The invention claimed is:

1. A method for producing a gasket on a component, comprising:
    a. providing a UV-curable gasket material;
    b. providing a shaping tool including an upper face and a lower face and at least one cavity which is open toward the lower face of the shaping tool and which is provided for filling with the gasket material, and wherein the shaping tool is made of a UV-transparent material at least in the region of the cavity;
    c. introducing the gasket material into the cavity of the shaping tool;
    d. placing the component onto the lower face of the tool provided with the gasket material;
    e. pressing the component onto the tool;
    f. curing the gasket material by way of UV irradiation; and
    g. removing the tool from the component and the gasket joined thereto,
    wherein steps c to g are performed in the indicated order and the gasket material is introduced into the cavity of the shaping tool by an automated robotic system.

2. A method for producing a gasket on a component, comprising:
    a. providing a UV-curable gasket material;
    b. providing a shaping tool including an upper face and a lower face and at least one cavity which is open toward the lower face of the shaping tool and which is provided for filling with the gasket material, and wherein the shaping tool is made of a UV-transparent material at least in the region of the cavity;
    c. introducing the gasket material into the cavity of the shaping tool;
    d. placing the component onto the lower face of the tool provided with the gasket material;
    e. pressing the component onto the tool;
    f. curing the gasket material by way of UV irradiation; and
    g. removing the tool from the component and the gasket joined thereto,
    wherein steps c to q are performed in the indicated order and the step of introducing the gasket material into the cavity of the shaping tool comprises screen printing the gasket material into the cavity.

3. The method according to claim 1, wherein the shaping tool is made of a flexible material at least in the region of the cavity.

4. The method according to claim 1, wherein the shaping tool is made of silicone.

5. The method according to claim 1, wherein the shaping tool is made of a flexible material at least in the region of the cavity and is made of non-flexible material in some regions other than the cavity.

6. The method according to claim 1, wherein the gasket material comprises a UV-curable polyacrylate- or polyisobutylene-based material.

7. The method according to claim 1, wherein curing of the gasket material is carried out in a UV chamber or by use of UV LED fields.

8. A method for producing a gasket on a component, comprising:
    a. providing a UV-curable gasket material;
    b. providing a shaping tool including an upper face and a lower face and at least one cavity which is open toward the lower face of the shaping tool and which is provided for filling with the gasket material, and wherein the shaping tool is made of a UV-transparent material at least in the region of the cavity;
    c. introducing the gasket material into the cavity of the shaping tool;
    d. placing the component onto the lower face of the tool provided with the gasket material;
    e. pressing the component onto the tool;

f. curing the gasket material by way of UV irradiation; and g. removing the tool from the component and the gasket joined thereto, wherein steps c to g are performed in the indicated order and curing of the gasket material is carried out using UV LEDs which are applied directly onto the shaping tool.

9. The method according to claim 1, wherein the shaping tool cavity has an opening directed toward the lower face and through which opening the cavity can be filled with a gasket material, and wherein other than the cavity, the shaping tool has no supply conduit that is open toward an edge of the shaping tool for supplying gasket material to the cavity.

10. The shaping tool according to claim 9, wherein an unbroken inner surface defines the cavity and there is no fluid connection through the wall to supply gasket material to the cavity.

11. The shaping tool according to claim 9, wherein the tool is made of a flexible material at least in the region of the cavity.

12. The shaping tool according to claim 9, wherein the shaping tool is made of a flexible material at least in the region of the cavity and is made of a non-flexible material in other regions.

13. The shaping tool according to claim 9, wherein UV LEDs are applied directly onto the shaping tool.

* * * * *

UNITED STATES PATENT AND TRADEMARK OFFICE
CERTIFICATE OF CORRECTION

PATENT NO. : 10,226,882 B2
APPLICATION NO. : 15/436995
DATED : March 12, 2019
INVENTOR(S) : Becher et al.

It is certified that error appears in the above-identified patent and that said Letters Patent is hereby corrected as shown below:

In the Claims

Column 6, Line 35: Change "steps c to q" to -- steps c to g --.

Signed and Sealed this
Twenty-second Day of October, 2019

Andrei Iancu
*Director of the United States Patent and Trademark Office*